US011060458B2

(12) United States Patent
Zager et al.

(10) Patent No.: US 11,060,458 B2
(45) Date of Patent: Jul. 13, 2021

(54) HEAT EXCHANGER THERMAL SHOCK REDUCER

(71) Applicant: Hamilton Sundstrand Corporation, Charlotte, NC (US)

(72) Inventors: Michael Zager, Windsor, CT (US); Donald E. Army, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 129 days.

(21) Appl. No.: 16/372,787

(22) Filed: Apr. 2, 2019

(65) Prior Publication Data

US 2020/0318548 A1    Oct. 8, 2020

(51) Int. Cl.
*F02C 7/18*    (2006.01)

(52) U.S. Cl.
CPC ........ *F02C 7/185* (2013.01); *F05D 2260/205* (2013.01); *F05D 2260/213* (2013.01)

(58) Field of Classification Search
CPC .............. F02C 7/185; F05D 2260/205; F05D 2260/213; G05D 23/13; G05D 23/138; G05D 23/1393
See application file for complete search history.

(56) References Cited

U.S. PATENT DOCUMENTS

| 4,062,432 | A | * | 12/1977 | Evans | F16D 35/022 |
| | | | | | 192/58.681 |
| 4,345,440 | A | * | 8/1982 | Allen | B60H 1/3204 |
| | | | | | 62/116 |
| 4,422,301 | A | * | 12/1983 | Watt | B01D 5/0036 |
| | | | | | 62/48.2 |
| 4,506,594 | A | * | 3/1985 | Rowland | B64D 13/04 |
| | | | | | 454/74 |
| 5,768,896 | A | | 6/1998 | Kline et al. | |
| 7,793,498 | B2 | | 9/2010 | Cook et al. | |
| 9,889,938 | B2 | | 2/2018 | Bruno et al. | |
| 2004/0226438 | A1 | * | 11/2004 | Jones | B64D 10/00 |
| | | | | | 95/45 |
| 2007/0234722 | A1 | | 10/2007 | Kalina | |
| 2012/0216760 | A1 | * | 8/2012 | Gibby | F01P 7/164 |
| | | | | | 123/41.1 |
| 2015/0053380 | A1 | * | 2/2015 | Army, Jr. | B23H 1/00 |
| | | | | | 165/166 |
| 2017/0296964 | A1 | | 10/2017 | Ashton et al. | |
| 2017/0305560 | A1 | | 10/2017 | Bruno | |
| 2019/0288303 | A1 | * | 9/2019 | Romet | H01M 8/04768 |

OTHER PUBLICATIONS

Extended European Search Report for EP Application No. 19213150.6, dated Jul. 3, 2020, pp. 7.

* cited by examiner

*Primary Examiner* — Marc E Norman
(74) *Attorney, Agent, or Firm* — Kinney & Lange, P. A.

(57) ABSTRACT

A heat exchanging arrangement includes a first flow circuit for a first fluid to be cooled, which has a first inlet, a first outlet, and a second outlet. The heat exchanging arrangement includes a second flow circuit for a second fluid, which is in thermal communication with the first flow circuit. The heat exchanging arrangement includes a third flow circuit configured to port a portion of the first fluid from a first location of the first flow circuit to a second location of the first flow circuit, the first location being downstream of the second location.

14 Claims, 2 Drawing Sheets

HEAT EXCHANGER THERMAL SHOCK REDUCER

BACKGROUND

In a gas turbine engine, air is pressurized in a compressor and mixed with fuel in a combustor for generating hot combustion gases which flow downstream through turbine stages. During operation, significant heat is generated by the high-pressure compressor, which generates high temperature flow. It may be necessary to manage heat generation within the engine so as not to raise engine temperatures to unacceptable levels, which may cause engine failure. One method of doing this is by using cooled bleed air to cool components. However, it may also be necessary to control the temperature of the compressor discharge air prior to such bleed air cooling other engine components. As such, heat exchangers have frequently been used to provide the necessary cooling of fluids within the aircraft engine. However, exposing heat exchangers directly to such high temperatures repetitively can fatigue the parts within the heat exchanger prematurely and reduce the overall useful life of the heat exchanger.

SUMMARY

A heat exchanging arrangement includes a first flow circuit for a first fluid to be cooled, which has a first inlet, a first outlet, and a second outlet. The heat exchanging arrangement includes a second flow circuit for a second fluid, which is in thermal communication with the first flow circuit. The heat exchanging arrangement includes a third flow circuit configured to port a portion of the first fluid from a first location of the first flow circuit to a second location of the first flow circuit, the first location being downstream of the second location.

A method of cooling an inlet fluid to a heat exchanger includes porting a first fluid to be cooled through a first flow circuit, porting a second fluid through a second flow circuit in thermal communication with the first fluid, and porting a portion of the first fluid from a first location of the first flow circuit to a second location of the first flow circuit, the first location being downstream of the second location.

The present summary is provided only by way of example, and not limitation. Other aspects of the present disclosure will be appreciated in view of the entirety of the present disclosure, including the entire text, claims, and accompanying figures.

Figure 1:
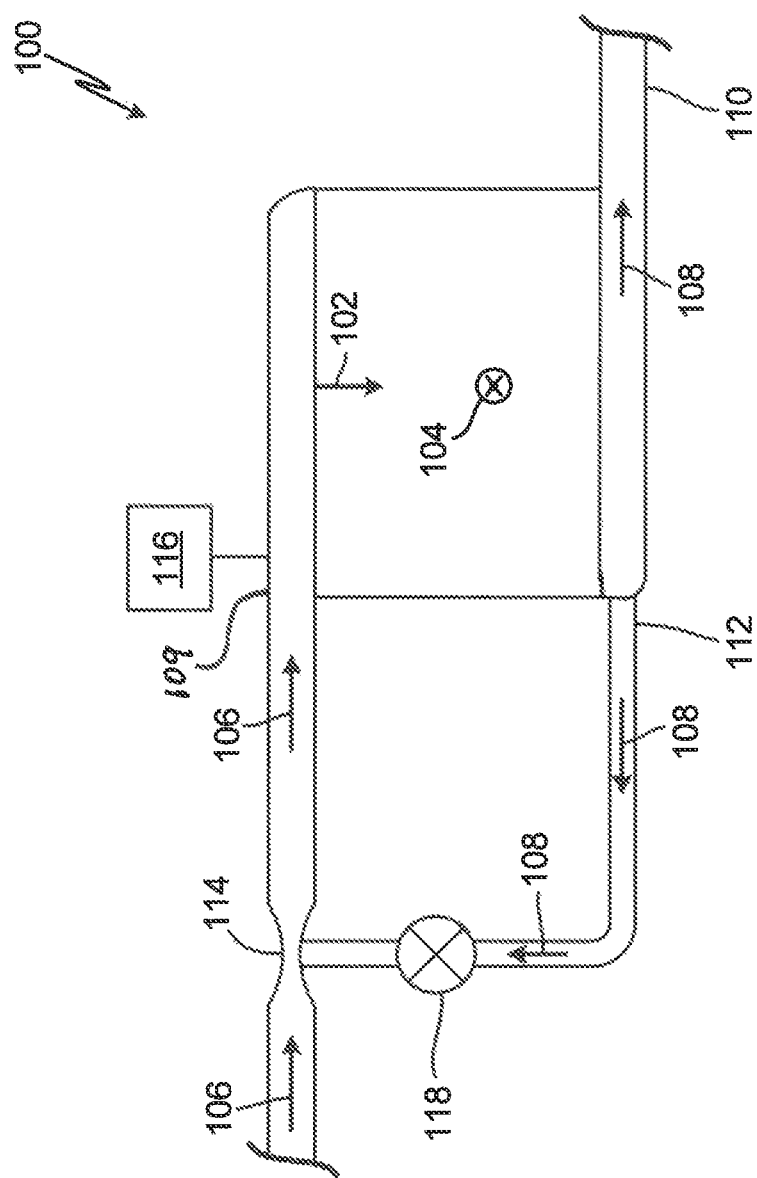
FIG. 1 is a schematic view of a heat exchanger.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In order to cool high pressure and temperature air discharged from a compressor, attempts have been made to utilize heat exchangers. However, the introduction of hot air directly into a heat exchanger can cause thermal shock to the heat exchanger. In other words, heat can be absorbed at different rates within the heat exchanger based on proximity to the hot air inlet and the thickness of the parts within the heat exchanger. Thin parts will heat up quickly compared to thicker parts and will correspondingly undergo thermal expansion more quickly compared to thicker parts. This mismatch in thermal expansion rates results in thermal shock and resultant high stresses in various parts of the heat exchanger. The greater the thermal shock the more quickly the heat exchanger will develop leaks due to fatigue, resulting in a reduced useful life.

Disclosed herein is a heat exchanger, which is able to cool hot air upstream of the heat exchanger by mixing conditioned air exiting from the heat exchanger before the hot air enters the heat exchanger. The cooling of the hot air takes place until the heat exchanger temperature reaches a predetermined value. The mixing of the conditioned air with the hot air before entering the heat exchanger allows the various parts within the heat exchanger to heat up at a more similar, and overall slower rate and correspondingly thermally expand at a more similar rate compared to introducing the hot air directly into the heat exchanger. As such, the thermal shock experienced by the heat exchanger is reduced, which leads to an enhancement of the useful life of the heat exchanger.

FIG. 1 is a schematic view of a heat exchanger. FIG. 1 shows heat exchanger 100 with first flow circuit 102, second flow circuit 104, hot air 106, conditioned air 108, first flow circuit inlet 109, first flow circuit first outlet 110, first flow circuit second outlet 112, Venturi feature 114, first temperature sensor 116, and valve 118.

First flow circuit 102 of heat exchanger 100 is configured next to second flow circuit 104 in heat exchanger 100 to facilitate thermal exchange between hot air 106 and a second fluid (not shown in FIG. 1). The second fluid acts as a heat sink for hot air 106 and can be, for example, ram air, fuel, oil, or other fluid. Hot air 106 can be, for example, bleed air from an engine, compressed air, or air from an auxiliary power unit. Hot air 106 can be from 300° F. (150° C.) to 1300° F. (700° C.). Hot air 106 can be from 450° F. (230° C.) to 1300° F. (700° C.). Hot air 106 can be from 750° F. (400° C.) to 1300° F. (700° C.). Hot air 106 can be from 1100° F. (590° C.) to 1300° F. (700° C.).

Hot air 106 enters heat exchanger 100 at first flow circuit inlet 109 and then undergoes thermal exchange with the second fluid and exits heat exchanger 100 as conditioned air 108 at either first flow circuit first outlet 110 or first flow circuit second outlet 112. Conditioned air 108 exiting first flow circuit first outlet 110 can, for example, be provided to an environmental control system for use in the cabin or flight deck of an aircraft, or can be used, for example, to cool an engine component such as the turbine blades, for buffer air cooling, or for an anti-ice system.

Conditioned air 108 exiting first flow circuit second outlet 112 can be used to cool hot air 106 before it enters heat exchanger 100. Conditioned air 108 can be mixed with hot air 106 at Venturi feature 114. The static pressure of hot air 106 is reduced at the constriction point of Venturi feature 114 and will draw conditioned air 108 into the flow circuit of hot air 106. Although additional fans or pumps can be used, the addition of Venturi feature 114 allows mixing of conditioned air 108 with hot air 106 without the use of any additional fans or pumps. The mixing of hot air 106 and conditioned air 108 reduces the temperature of hot air 106 before entering heat exchanger 100. As such, heat exchanger 100 experiences less thermal shock and is able to reach operating temperature more slowly. By reducing the amount of thermal shock experienced by heat exchanger 100, the useful life of heat exchanger 100 can be extended.

Temperature sensor 116 can be used to sense the temperature of heat exchanger 100. Although temperature sensor 116 is depicted as being near the entrance of hot air 106 of heat exchanger 100 in FIG. 1, temperature sensor 116 can be located anywhere on or within heat exchanger 100. A measurement from temperature sensor 116 can be used to open valve 118 on, for example, initial engine start up. Valve 118 can then be closed after a set time has elapsed or after a threshold temperature has been reached at temperature sensor 116. Once the parts within heat exchanger 100 have reached a similar temperature under load, conditioned air 108 is no longer needed to cool hot air 106 and valve 118 may be closed. Alternatively, valve 118 may always remain open during initial flow of hot air 106 and then close when temperature sensor 116 indicates a threshold temperature.

Temperature sensor 116 can be configured to pneumatically open valve 118. For example, temperature sensor 116 can be set to pneumatically open valve 118 when heat exchanger 100 reaches a threshold temperature. A controller (not shown in FIG. 1) can receive a signal from temperature sensor 116 and send a signal to open or close valve 118 in response to the received signal. A second temperature sensor (not shown in FIG. 1) can also be used to sense the temperature of hot air 106 upstream of Venturi feature 114. The controller can compare the sensed temperature from temperature sensor 116 and the sensed temperature from second temperature sensor upstream of Venturi feature 114. When the temperature difference is greater than a threshold value, the controller can send a signal to valve 118 to open. When the temperature difference is lower than the threshold value, the controller can send a signal to valve 118 to close. For example, if 100° F. (40° C.) is set as the threshold value, then when the difference between the sensed temperature from temperature sensor 116 and the sensed temperature from second temperature sensor upstream of Venturi feature 114 is greater than 100° F. (40° C.), then the controller can send a signal to valve 118 to open. Conversely, when the difference between the sensed temperature from temperature sensor 116 and the sensed temperature from second temperature sensor upstream of Venturi feature 114 is less than 100° F. (40° C.), the controller can then send a signal for valve 118 to close.

Alternatively, a mechanical device such as a disc bimetallic thermostat can be used to control valve 118. In other words, the mechanical device is passive and does not require a signal from a controller but still opens or closes based on either temperature sensor 106 reaching a threshold temperature or when the mechanical device senses a temperature difference between hot air 106 and conditioned air 108.

Heat exchanger 100 can be manufactured using brazed plate-fin, brazed tube bundle, or additive manufacturing techniques. Heat exchanger 100 can be made up of any metal or alloy capable of withstanding the operational temperature range of heat exchanger 100. For example, aluminum can be used if the operational temperature range of heat exchanger 100 is below approximately 450° F. (230° C.). However, for the operational temperature range above 450° F. (230° C.), other metals or alloys may be required, such as, for example, steel, nickel, titanium, or copper.

Figure 2:
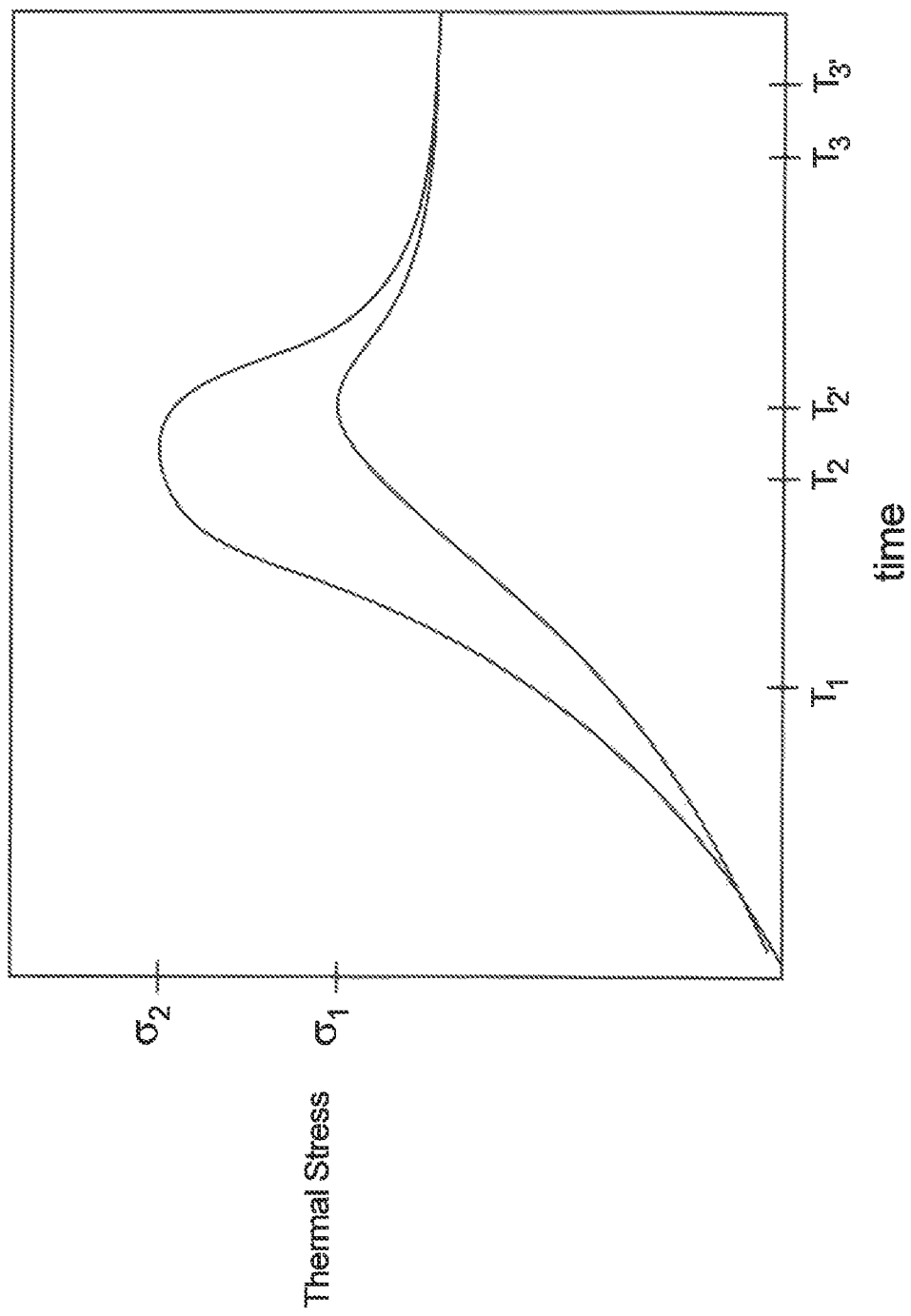
FIG. 2 is a graph of thermal stress imparted on a heat exchanger, as a function of time.

FIG. 2 is a graph of the thermal stress imparted on the heat exchanger plotted as a function of time. FIG. 2 shows the thermal stress experienced by a heat exchanger with and without mixing of conditioned air with the hot air before entering the heat exchanger. At time $T_1$ the flow of hot air is ramping up and both heat exchangers, with and without cooling, begin to experience thermal stress. However, the thermal stress experienced by the heat exchanger with cooling, ramps up more slowly than the thermal stress experienced by the heat exchanger without cooling.

At time $T_2$ the flow of hot air has completed ramping up and the thermal stress experienced by both heat exchangers are at their maximum. However, cooling the heat exchanger can delay the onset of the thermal stress maximum, designated as $T_{2'}$ in FIG. 2. These thermal maxima are when the thermal expansion differences between the thin- and thick-walled parts of the heat exchangers are at their greatest. The thermal stress experienced by the heat exchanger with cooling is able to more closely match the thermal expansion rates of the thin- and thick-walled parts within the heat exchanger and, as such, experiences a reduced thermal stress maximum $\sigma_1$ compared to the heat exchanger without cooling, which experiences a higher thermal stress maximum $\sigma_2$.

At time $T_3$ the thin- and thick-walled parts within the heat exchangers have finished thermally expanding and have reached a steady-state, where there is no longer any thermal expansion mismatch between the thin- and thick-walled parts. However, cooling the heat exchanger can delay the establishment of the steady-state condition, designated as $T_{3'}$ in FIG. 2. Once the steady-state condition has been established, the thermal stress experienced by both heat exchangers, with and without cooling, is the same.

By using conditioned air to cool the hot air before it enters the heat exchanger, overall inlet temperature is reduced and allows a more gradual transition to a steady state condition. This results in a reduction of peak thermal stress experienced by the heat exchanger and a commensurate reduction of part fatigue, and can provide for lower leakage rates within the heat exchanger. Part fatigue may include, for example, separation at the corners of the heat exchanger or cracking of thin-walled parts within the heat exchanger. As such, the service life of the heat exchanger may be increased.

Discussion of Possible Embodiments

The following are non-exclusive descriptions of possible embodiments of the present invention.

A heat exchanging arrangement includes a first flow circuit for a first fluid to be cooled, which has a first inlet, a first outlet, and a second outlet. The heat exchanging arrangement includes a second flow circuit for a second fluid, which is in thermal communication with the first flow circuit. The heat exchanging arrangement includes a third flow circuit configured to port a portion of the first fluid from a first location of the first flow circuit to a second location of the first flow circuit, the first location being downstream of the second location.

The heat exchanging arrangement of the preceding paragraph can optionally include, additionally and/or alternatively, any one or more of the following:

A Venturi feature located at the junction of the second location and the first flow circuit and is configured to draw the first fluid from the third flow circuit into the first flow circuit.

A heat exchanger includes a first flow circuit for air to be cooled and a second flow circuit for a fluid configured to be a heat sink for air. The heat exchanger also includes a first outlet for delivery of conditioned air to a system component; a Venturi feature located in an upstream pathway of air before entering the heat exchanger; and a second outlet for delivery of conditioned air at the Venturi feature, such that the second outlet is in fluid communication with air at the Venturi feature before entering the heat exchanger. The heat exchanger also includes a first temperature sensor, positioned to sense the temperature of the heat exchanger and a mixing valve, responsive to the first temperature sensor, where the mixing valve is located between the second outlet and the Venturi feature.

The heat exchanger of the preceding paragraph can optionally include, additionally and/or alternatively, any one or more of the following:

The heat exchanger includes a controller.

The controller sends a signal to open the mixing valve when the first temperature sensor reaches a threshold value.

The controller sends a signal to close the mixing valve when the first temperature sensor reaches a steady-state value.

The first temperature sensor is a bimetallic thermostat and is located adjacent to a first flow circuit inlet.

The bimetallic thermostat sends a signal to open the mixing valve when the bimetallic thermostat reaches a threshold value.

The bimetallic thermostat sends a signal to close the mixing valve when the bimetallic thermostat reaches a steady-state value.

The heat exchanger includes a second temperature sensor located upstream of the Venturi feature.

The threshold value is compared to a calculated value, wherein the calculated value is the difference between the first temperature sensor and the second temperature sensor.

The steady-state value is compared to a calculated value, wherein the calculated value is the difference between the first temperature sensor and the second temperature sensor.

The air is aircraft engine bleed air and has a temperature upstream of the Venturi feature from 300° F. to 1300° F., inclusive.

The heat exchanger is formed of a metal or alloy and is selected from the group consisting of aluminum, nickel, titanium, steel, copper, or combinations thereof.

The heat exchanger is manufactured using brazed plate-fin, brazed tube bundle, or additive manufacturing techniques.

A method of cooling an inlet fluid to a heat exchanger includes porting a first fluid to be cooled through a first flow circuit, porting a second fluid through a second flow circuit in thermal communication with the first fluid, and porting a portion of the first fluid from a first location of the first flow circuit to a second location of the first flow circuit, the first location being downstream of the second location.

The method of the preceding paragraph can optionally include, additionally and/or alternatively, any one or more of the following:

The method includes sensing a temperature of a first temperature sensor positioned to sense the temperature of the heat exchanger and sensing a temperature of a second temperature sensor positioned to sense the temperature of the first fluid upstream of the second location.

The method includes comparing a threshold value to a calculated value and the calculated value is the difference between the first temperature sensor and the second temperature sensor.

A controller sends a signal to open a mixing valve when the difference between the first temperature sensor and the second temperature sensor is greater than the threshold value.

A controller sends a signal to close a mixing valve when the difference between the first temperature sensor and the second temperature sensor is less than the threshold value.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanging arrangement, comprising:
a first flow circuit for a first fluid to be cooled, the first flow circuit having a first inlet and a first outlet and a second outlet;
a second flow circuit for a second fluid, the second flow circuit being in thermal communication with the first flow circuit;
a third flow circuit configured to port a portion of the first fluid from a first location of the first flow circuit to a second location of the first flow circuit, the first location being downstream of the second location;
a Venturi feature located at the junction of the second location and the first flow circuit configured to draw the first fluid from the third flow circuit into the first flow circuit;
a first temperature sensor, positioned to sense the temperature of the heat exchanging arrangement;
a mixing valve which is responsive to the first temperature sensor and located between the second outlet and the Venturi feature;
a second temperature sensor located upstream of the Venturi feature and positioned to sense the temperature of the air; and
a controller;
wherein a threshold value is compared to a calculated value, wherein the calculated value is the difference between the first temperature sensor and the second temperature sensor.

2. A heat exchanger comprising:
a first flow circuit for air to be cooled;
a second flow circuit for a fluid configured to be a heat sink for air;
a first outlet for delivery of conditioned air to a system component;
a Venturi feature located in an upstream pathway of air at an entrance of the heat exchanger;
a second outlet for delivery of conditioned air at the Venturi feature, the second outlet in fluid communication with air upstream of the Venturi feature before entering the heat exchanger;
a first temperature sensor, positioned to sense the temperature of the heat exchanger;
a mixing valve, responsive to the first temperature sensor, the mixing valve located between the second outlet and the Venturi feature;
a second temperature sensor located upstream of the Venturi feature and positioned to sense the temperature of the air; and
a controller;
wherein a threshold value is compared to a calculated value, wherein the calculated value is the difference between the first temperature sensor and the second temperature sensor.

3. The heat exchanger of claim 2, wherein the controller sends a signal to open the mixing valve when the first temperature sensor reaches the threshold value.

4. The heat exchanger of claim 2, wherein the controller sends a signal to close the mixing valve when the first temperature sensor reaches a steady-state value.

5. The heat exchanger of claim 2, wherein the first temperature sensor is a bimetallic thermostat located adjacent to a first flow circuit inlet.

6. The heat exchanger of claim 5, wherein the bimetallic thermostat sends a signal to open the mixing valve when the bimetallic thermostat reaches a threshold value.

7. The heat exchanger of claim 5, wherein the bimetallic thermostat sends a signal to close the mixing valve when the bimetallic thermostat reaches a steady-state value.

8. The heat exchanger of claim 2, wherein the steady-state value is compared to a calculated value, wherein the calculated value is the difference between the first temperature sensor and the second temperature sensor.

9. The heat exchanger of claim 2, wherein the air is aircraft engine bleed air and has a temperature upstream of the Venturi feature from 300° F. to 1300° F., inclusive.

10. The heat exchanger of claim 2, wherein the heat exchanger is formed of a metal or alloy and is selected from the group consisting of aluminum, nickel, titanium, steel, copper, or combinations thereof.

11. The heat exchanger of claim 2, wherein the heat exchanger is a brazed plate fin heat exchanger, a brazed tube bundle heat exchanger, or an additively manufactured heat exchanger.

12. A method of cooling an inlet fluid to a heat exchanger comprising:

porting a first fluid to be cooled through a first flow circuit, wherein the first flow circuit comprises a first inlet, a first outlet, and a second outlet;

porting a second fluid through a second flow circuit in thermal communication with the first fluid within the first flow circuit;

porting a portion of the first fluid from a first location of the first flow circuit to a second location of the first flow circuit, the first location being downstream of the second location;

sensing a temperature of a first temperature sensor positioned to sense the temperature of the heat exchanger;

sensing a temperature of a second temperature sensor positioned to sense the temperature of the first fluid upstream of the second location;

comparing a threshold value to a calculated value, wherein the calculated value is the difference between the first temperature sensor and the second temperature sensor; and sending a signal from a controller to a mixing valve.

13. The method of claim 12, wherein the controller sends a signal to open the mixing valve when the difference between the first temperature sensor and the second temperature sensor is greater than the threshold value.

14. The method of claim 12, wherein the controller sends a signal to close the mixing valve when the difference between the first temperature sensor and the second temperature sensor is less than the threshold value.

* * * * *